United States Patent Office 3,679,603
Patented July 25, 1972

---

3,679,603
CATALYST FOR OXIDATION OF OLEFINS
Artur Maximovich Garnish, ulitsa Chernyshevskogo, 25-a, kv. 4, and Lev Moiseevich Shafransky, ulitsa Ostrovskogo, 11, kv. 2, both of Novokuibyshevsk, Kuibyshevskoi oblasti, U.S.S.R., and Galina Antonova Ischerikova, ulitsa Iskra, 1a, kv. 63, Gorky, U.S.S.R.
No Drawing. Filed Jan. 15, 1970, Ser. No. 3,198
Int. Cl. B01j *11/82*
U.S. Cl. 252—432
2 Claims

ABSTRACT OF THE DISCLOSURE

A catalyst for oxidation of olefins, based on bismuth, molybdenum and oxygen, as well as silicon, or silicon and an alkali metal, or silicon and boron, or silicon, an alkali metal and boron, the empirical formula of the catalyst being $$Bi_aSi_bMo_cM_dB_eO_f$$

where

M is an alkali metal;
$a = 5-20$
$b = 0.02-1$
$c = 12$
$d = 0-2.3$
$e = 0-0.1$
$f = 43-72$ The catalyst may also comprise a carrier with the specific surface of 0.3–3 m.²/g. in an amount of 20–90% of the total weight of the catalyst.

---

The present invention relates to catalysts for oxidation of olefins to $\alpha,\beta$-unsaturated carbonyl compounds by oxygen or oxygen-containing gases in a gas phase at an elevated temperature.

Known in the art are various catalysts for oxidizing olefins to unsaturated carbonyl compounds, such as cuprous oxide (cf. U.S. Pat. No. 2,451,485), selenium-promoted cupric oxide (cf. British Pat. No. 706,552), a mixture of antimony and tin oxides (cf. British Pats. Nos. 904,602, 906,328, 964,357), systems based on vanadium, phosphorus and molybdenum oxides (cf. U.S. Pat. No. 3,038,-942).

From the standpoint of the present invention those catalytic systems are of interest, which incorporate bismuth and molybdenum compounds in one or another form.

The applicability of such systems for oxidizing olefins to unsaturated aldehydes was first reported in U.S. Pat. No. 2,941,007 and in British Pat. No. 821,999, where for oxidizing propylene to acrolein a catalyst was proposed based on bismuth, molybdenum and oxygen in a combination with phosphorus or without it. The empirical formula of the catalyst composition is $$Bi_aP_bMo_cO_d$$

where $a = 5-18$
$b = 0-5$
$c = 12$
$d = 36-76$

Said catalyst may comprise a carrier. As the most suitable carrier it is recommended to use silicon oxide in an amount of 25–75% of the total weight of the catalyst.

Best results were attained on the catalyst with the empirical formula $Bi_6PMo_{12}O_{36}$, comprising 30% of $SiO_2$ as the carrier. The conversion of propylene reached 56.9%, yield of acrolein (catalyst selectivity) reached 71.9%. The catalyst efficiency is not specified, but, according to the data presented in the patent, the yield of acrolein per litre of the catalyst may be calculated to be 62.2 g./hr.

The known catalysts based on bismuth, molybdenum and oxygen feature low mechanical strength, which complicates their use on industrial installations. Besides, the activity of said catalysts deteriorates with their prolonged employment.

An object of the present invention is to provide a novel composition of a catalyst for oxidizing of olefins, based on bismuth, molybdenum and oxygen.

In accordance with the above and other objects, the present invention resides in the use of a catalyst which, together with said elements, comprises silicon, or silicon and an alkali metal, or silicon and boron, or silicon, an alkali metal and boron, the empirical formula of the catalyst being $$Bi_aSi_bMo_cM_dB_eO_f$$

where

M is an alkali metal
$a = 5-20$
$b = 0.02-1$
$c = 12$
$d = 0-2.3$
$e = 0-0.1$
$f = 43-72$ The present catalyst for oxidation of olefins features high activity and selectivity, as well as high mechanical strength and stability in operation.

The catalyst proves to be inexpensive when it incorporates a carrier with the specific surface of 0.3–3 m.²/g. in an amount of 20–90% of the total weight of the catalyst.

The catalyst is prepared as follows.

First an active bismuth-molybdenum mass is obtained by precipitating bismuth nitrate and ammonium molybdate from solutions, or by mixing respective oxides or hydroxides, or, else, by thorough mixing of bismuth nitrate and molybdic acid, or by any other conventional methods. The resulting mass is dried at a temperature of 40–150° C., calcined at a temperature of 400–600° C. and comminuted.

To the comminuted mass there is added, with stirring, an aqueous solution comprising silicic acid in the form of a hydrosol, or an aqueous solution of a silicate of an alkali metal.

The addition of silicic acid or its salt enhances the plasticity of the catalytic mass, which facilitates the process of its shaping and increases the strength of the catalyst. The presence of silicon in the catalyst composition within the above-specified limits enhances the catalyst activity without impairing its selectivity.

Ions of alkali metals have a promoting effect on the catalyst action.

A further improvement in the properties of the catalyst can be attained by adding boric acid to the obtained mass, the acid being in the form of an aqueous or organic solution. The incorporation of boron into the catalyst composition increases the mechanical strength of the catalyst and diminishes its porosity, which results in an increased selectivity of the catalyst. An excess addition of boron, however (more than specified hereinabove), would result in a decrease of the catalyst activity. It has been established, that boron is also a radical means for inhibiting the volatility of molybdenum oxide which is formed in the course of the catalyst operation.

Taking into account the promoting effect of ions of alkali metals on the catalyst operation, an aqueous solution of an alkali metal borate may be added instead of the solution of boric acid.

The wet plastic mass, obtained after the addition of the above-said solutions, is thoroughly mixed, shaped, dried at a temperature of 40–180° C. and calcined at a temperature of 400–600° C.

For making the catalyst less costly, the latter may be prepared on a carrier with a specific surface of 0.3–3 m.²/g. Such materials as, e.g., pumice, Carborundum, corundum, may be used as the carrier. In case the catalyst is prepared with the use of a carrier, the latter is impregnated separately with solutions containing one or several components of the catalytic mass. After each impregnation, the carrier is dried at a temperature of 40–180° C. and calcined at a temperature of 40–600° C.

For a better understanding of the present invention, given hereinbelow are examples of preparing the catalyst, as well as the results of testing thereof.

EXAMPLE 1

94.4 g. of neutral bismuth nitrate $Bi(NO_3)_3.5H_2O$ were dissolved in 105 ml. of an aqueous solution of nitric acid (1:3). To the obtained solution, for precipitating bismuth hydroxide, a 25% solution of ammonia was added for the reaction, when tested on methyl orange, to be alkaline. The precipitate was filtered off and washed once with cold water. To the wet precipitate thus obtained, with thorough stirring, there were added 31.1 g. of molybdic acid. The resulting mixture was dried at a temperature of 120° C. during 4 hours until completely dry, and then calcined at a temperature of 550° C. during 1.5 hours. Thereafter the mass was comminuted and sifted through a sieve with a mesh diameter equal to 0.25 mm.

To 50 g. of the resulting bismuth-molybdenum mixture there were added 10 ml. of an aqueous solution containing 2.4 g. of sodium silicate $Na_2SiO_3.9H_2O$, thoroughly mixed and shaped on a screw extruder. The wet catalyst was first dried in air to air-dry state thereof at a temperature of 20–25° C., and then during 3 hours with a gradual increase of the temperature from 80 to 135° C. Further the catalyst was calcined in a kiln in a stream of air at a temperature of 550° C. during 2 hours.

10 ml. of the obtained catalyst were charged into a reactor which was made as a tube of stainless steel with the inner diameter of 20 mm., placed in a bath filled with a mixture of sodium nitrate and saltpeter. With the feeding of propylene at a rate of 6.13 l./hr. and air at a rate of 20.87 l./hr., the temperature being 460° C. and pressure atmospheric, the conversion of propylene was 30% with the catalyst selectivity equal to 85%.

The yield of acrolein per litre of the catalyst was 496 g./hr. The crushing strength of the catalyst was equal to 100 kg./cm.².

A catalyst, prepared similarly to that described in the present example, but without sodium silicate, featured crushing strength of 15 kg./cm.². The conversion of propylene to acrolein on this catalyst amounted to 29% with the selectivity of the catalyst being 75%.

EXAMPLE 2

20 g. of ammonium molybdate $(NH_4)_2MoO_4$ were dissolved in 60 ml. of water. The resulting solution was added, while stirring, to 36 ml. of concentrated nitric acid, whereupon 54.24 g. of neutral bismuth nitrate $Bi(NO_3)_3.5H_2O$ were dissolved therein. The solution thus prepared was used to impregnate corundum balls 3–4 mm. in diameter during 30 minutes. The excess solution was drained off, and the impregnated carrier was dried at a temperature gradually increased from 40 to 140° C. during 2 hours. The operations of impregnation and drying were repeated three times. After the last drying procedure the carrier was impregnated during 30 minutes with 90 ml. of an aqueous solution containing 2.13 g. of sodium silicate $Na_2SiO_3.9H_2O$. The excess solution was drained off, and the catalyst was dried at a temperature of 140° C. during 1 hour and calcined at a temperature of 550° C. for 1 hour. The content of the carrier was 60% of the total weight of the catalyst.

When testing the given catalyst under the conditions similar to those of Example 1, the results were as follows: propylene conversion—18%; catalyst selectivity—80%; acrolein yield per litre of the catalyst—279 g./hr.

EXAMPLE 3

109 g. of bismuth nitrate $Bi(NO_3)_3.5H_2O$ were dissolved in 100 ml. of water, acidified with 3 drops of 1 N solution of nitric acid. With thorough stirring, to the solution was added 50 g. of ammonium molybdate $(NH_4)_2MoO_4$ dissolved in 140 ml. of water. The obtained mixture was evaporated on a water bath to the air-dry state, and then dried in a cabinet drier at a temperature of 120° C. during 2 hours. The dry mass was calcined at 550° C. for 1 hour, comminuted and sifted through a sieve with meshes 0.25 mm. in diameter.

To 50 g. of the resulting bismuth-molybdenum mass there were added 10 ml. of an aqueous solution containing 2.6 g. of sodium silicate $Na_2SiO_3.9H_2O$, and then 3 ml. of a 1.5% aqueous solution of boric acid. The obtained plastic mass was shaped into small cylinders 3–4 mm. in diameter. The wet catalyst was dried first at room temperature during 24 hours and then at a temperature of 120° C. during 1 hour.

The obtained catalyst featured a crushing strength of 140 kg./cm.². The obtained catalyst was tested in a reactor described in Example 1. In all the experiments the amount of the catalyst charged was 10 ml., and pressure atmospheric. Other technological characteristics of the experiments and the results of tests are presented hereinbelow.

(a) The reactor was fed with propylene at a rate of 6.13 l./hr. and air at a rate of 27.87 l./hr. The oxidation was carried out at a temperature of 460° C.

Under the specified conditions the conversion of propylene to acrolein was 45%, catalyst selectivity—90%, yield of acrolein per litre of the catalyst—620 g./hr.

After the catalyst was used under the same conditions during 1,000 hours, no essential changes were observed in the above-specified characteristics.

(b) The reactor was fed with propylene at a rate of 3.28 l./hr. and with technical oxygen at a rate of 2.34 l./hr. To alleviate the reaction conditions, steam was also fed into the reactor at a rate of 8.78 l./hr., as calculated for the normal conditions. The temperature in the reactor was maintained to be 420° C.

Under said conditions the propylene conversion was 40%, catalyst selectivity—85%, yield of acrolein per litre of the catalyst—279 g./hr.

(c) The reactor was fed with a technical propane-propylene fraction, comprising 40% of propylene and 60% of propane with admixtures, at a rate of 1.63 l./hr., and with air at a rate of 6.2 l./hr.

The oxidation was carried out at a temperature of 460° C.

Under said conditions the propylene conversion was 80%, catalyst selectivity—75%, yield of acrolein per litre of the catalyst—96.3 l./hr.

(d) The reactor was fed with isobutylene at a rate of 60.8 l./hr. and with air at a rate of 20.72 l./hr. The oxidation was carried out at a temperature of 460° C.

Under said conditions the conversion of isobutylene was 12%, catalyst selectivity—70%, yield of methacrolein per litre of the catalyst—160 g./hr.

Though the present invention has been described in connection with its preferred embodiment, it will be under-

What is claimed is:

1. A catalyst for the oxidation of olefins consisting essentially of bismuth, silicon, molybdenum, an alkali metal and oxygen; the catalyst having 5 to 20 bismuth atoms, 0.02 to 1 silicon atom, not more than 2.3 alkali metal atoms, and 43 to 72 oxygen atoms for each 12 molybdenum atoms.

2. A catalyst according to claim 1, which also contains from 0 to 0.1 boron atom for each 12 molybdenum atoms.

References Cited

UNITED STATES PATENTS

| | | | |
|---|---|---|---|
| 3,044,966 | 7/1962 | Callahan et al. | 252—456 X |
| 3,186,955 | 6/1965 | Callahan et al. | 252—456 X |
| 3,248,340 | 4/1966 | Callahan et al. | 252—432 |
| 2,691,660 | 10/1954 | Hartig | 252—432 X |
| 3,029,288 | 4/1962 | Etherington | 252—432 X |
| 3,387,038 | 6/1968 | Koch | 260—604 |
| 3,437,690 | 4/1969 | Young et al. | 252—456 X |

PATRICK P. GARVIN, Primary Examiner

U.S. Cl. X.R.

252—456; 260—604 R